Figure 1:
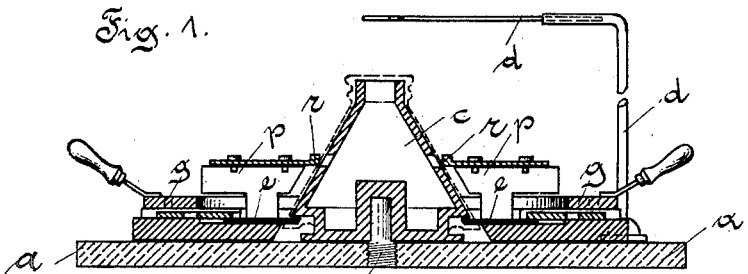

(No Model.) 2 Sheets—Sheet 1.

B. GRUHL.
APPARATUS FOR CUTTING AND ORNAMENTING HOLLOW GLASS BODIES.

No. 595,017. Patented Dec. 7, 1897.

Witnesses:
H. K. Boulter
G. Thorntrup

Inventor:
Bernhard Gruhl,
By Wm E. Boulter,
Attorney (No Model.) 2 Sheets—Sheet 2.
B. GRUHL.
APPARATUS FOR CUTTING AND ORNAMENTING HOLLOW GLASS BODIES.
No. 595,017. Patented Dec. 7, 1897.
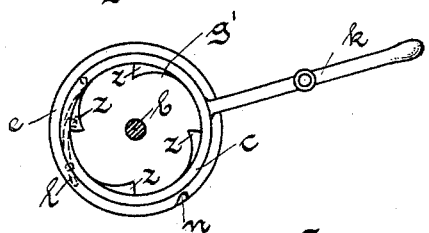
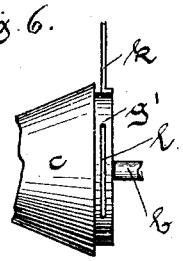
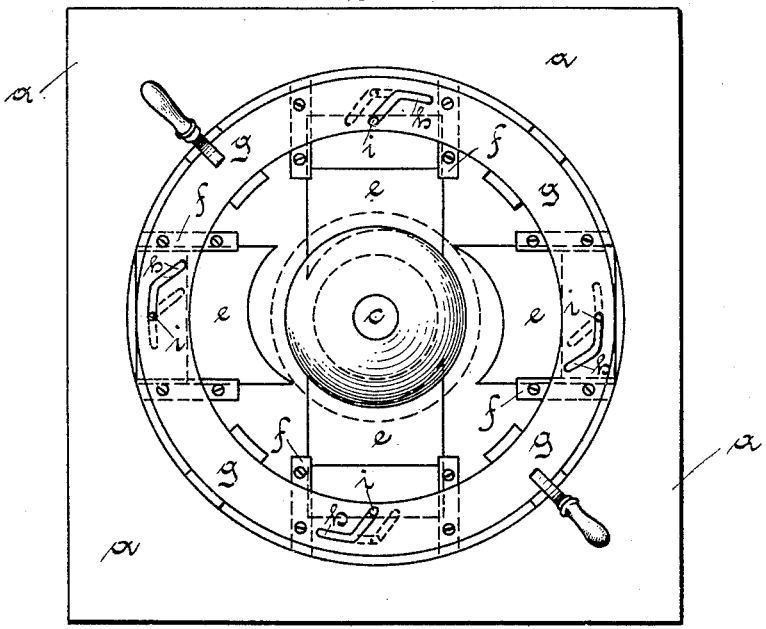
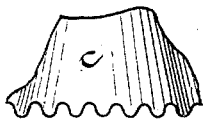
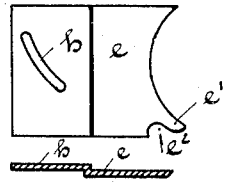
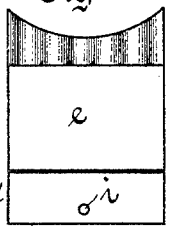
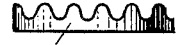
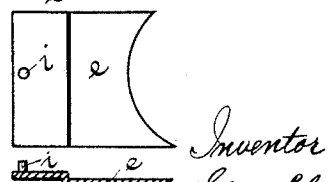

UNITED STATES PATENT OFFICE.

BERNHARD GRUHL, OF DRESDEN, GERMANY.

APPARATUS FOR CUTTING AND ORNAMENTING HOLLOW GLASS BODIES.

SPECIFICATION forming part of Letters Patent No. 595,017, dated December 7, 1897.

Application filed June 8, 1896. Serial No. 594,778. (No model.) Patented in Germany October 6, 1894, No. 86,483.

*To all whom it may concern:*

Be it known that I, BERNHARD GRUHL, a subject of the King of Saxony, residing at Dresden, Germany, have invented certain new and useful Improvements in Apparatus for the Cutting and Ornamentation of Hollow Glass Bodies, (for which I have obtained Letters Patent in Germany, dated October 6, 1894, No. 86,483,) of which the following is a specification.

The present invention relates to an apparatus for cutting the edges of hollow hot glass bodies, while at the same time any desired pattern can be cut out in the hollow glass surface either for ornamental or for technical purposes.

The present invention has for its object to cut the edges and to cut through the surface of hollow glass bodies, when they are in plastic state, by means of an apparatus in which suitably-shaped cutters can be moved radially relatively to the hollow glass body placed on a mandrel. The cutting edges of said cutters produce a scissors-like cut in coöperation with correspondingly-shaped edges or recesses in the body of the mandrel.

In order to prevent any alteration of the shape of the hollow glass body in its plastic state, the cutting edges of the cutters must be brought into engagement with the body to be worked, when this scissors-like cut is to be executed only gradually, for which purpose the cutting edges of the cutters are made with one or more points, which penetrate the glass before the other portions of the cutting edge reach their cutting position.

The apparatus for the practical application of this process consists, mainly, of a mandrel fixed to a foundation-plate, on which mandrel the hollow glass body is placed when still hot, of cutters movable relatively to said mandrel and of a rotatable ring, the movements of which produce the advance and retraction of the cutters.

In the application of this process the cutters may effect the cutting either simultaneously, in which case their cutting surfaces correspond to the whole circumference of the body to be operated upon, or they may be advanced in turns, so that one comes into operation and is withdrawn and another is advanced simultaneously with the withdrawal of the preceding one, and so on throughout the series. When bodies of large circumference are to be operated upon, it is advantageous, in order to avoid the necessity for making the apparatus of great size, to execute the cutting in successive portions or stages with one or several cutters, for which purpose the mandrel with the piece to be operated on is intermittently rotated, and each time the rotating mechanism makes its inoperative movement the cutter is brought against the piece to be cut, which is then at rest, and so the cutting is done in several stages.

Figure 2:
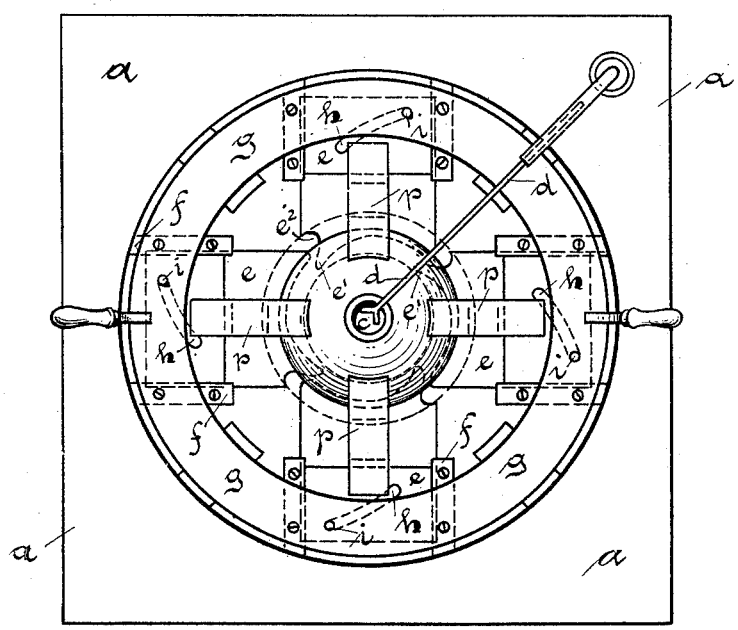
Figure 4:
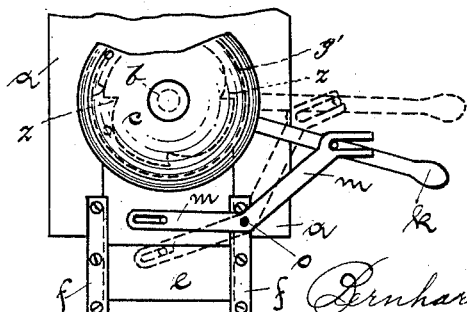

In the accompanying drawings, Figure 1 shows the apparatus in section. Fig. 2 is a plan of the apparatus with four simultaneously-moving cutters. Fig. 3 is a view generally similar to Fig. 2, but with two pairs of alternately-working cutters. Fig. 4 is a plan of an apparatus with only one cutter, in which the mandrel is turned one revolution in four stages and the cutter is advanced during the periods of rest of the mandrel. Figs. 5 and 6 show the rotating devices for the mandrel in, respectively, plan of under side and side elevation. Figs. 7 and 8 are, respectively, views of a cutter for simultaneous and for alternate cutting. Fig. 9 shows a portion of the mandrel with a wavy or crenulated cutting edge for coöperating with the cutter. Figs. 10 and 11 illustrate the cutting-surface of a cutter for producing wavy cuts, and Fig. 12 shows cutters for producing ornamental cuts in the surface of the hollow glass object or body.

In the apparatus represented in Figs. 1 and 2 there is a metal core or mandrel $c$, mounted on a central pin $b$ of the base-plate $a$. The mandrel may be either solid or hollow, and adapted to be heated. On this mandrel is placed the hollow glass body to be cut, still hanging on the blowpipe, and the pipe has a resting-point exactly at the center of the apparatus in the support $d$. On the base-plate $a$ are arranged the movable cutters $e$, which are guided in guides $f$. Over the cutter $e$ is arranged a revoluble ring $g$, to which the cutters are connected by rollers or pins $i$, sliding in curved slots $h$, so that when the ring is turned in one direction the cutters advance radially toward the work and when the ring is turned in the opposite direction the cutters are retracted. The cutting edges of the cutters are made, according to the circumference of the object to be finished, either smooth or in the shape of arcs, or notched, or otherwise, and are provided at one part with a point $e'$, which is the first to penetrate the plastic glass.

When the hollow glass body is to be cut throughout its circumference at one operation, the cutters, in order to encircle the whole of the circumference of the object, must engage with each other. For this purpose there are arranged adjacent to the points $e'$ recesses $e^2$, into which the edge of the next cutter is adapted to fit.

The mode of working the apparatus is very simple. The hollow glass object is placed, by means of the glass-blower's pipe, on which it still hangs, over the mandrel $c$, which may be heated, or which may remain hot in consequence of continuous contact with hot glass, and then the ring $g$ is turned, whereby the four cutters $e$, operated by said ring, advance uniformly and at first penetrate the glass with their points and then effect the cutting in their farther advance in coöperation with the cutting edge of the mandrel, which edge acts as the second blade of a pair of scissors or shears.

The shape of the cut varies according to the shape of the cutters and mandrel employed. For instance, it may be straight or, as illustrated in Figs. 9 to 11, curved and wavy, or it may be of any other shape.

Simultaneously with the cutting of the edges of the hollow glass object or body its surface may be decorated by cutting out in it different patterns, and for this purpose there are arranged, as shown in Figs. 1 and 2, plungers $p$, mounted on the cutters $e$, so that the former are moved radially with the latter to and from the object to be cut. They have on their inner ends cutters or punches $r$, while in the mandrel there are recesses or apertures having the shape of the ornamentations to be produced, which recesses act as dies, so that when the punches $r$ advance the latter cut the ornamentations in the plastic glass, the pieces of glass cut out falling into the mandrel. The decorative cutting of the glass may be effected without simultaneously cutting the edges of the hollow glass object.

The apparatus represented in Fig. 3 shows substantially the same arrangements as in Figs. 1 and 2, only here the four cutters are advanced alternately, the cutters situated diametrically opposite each other being moved simultaneously inward or outward. For this purpose the cam-slots $h$ are arranged in the turning ring $g$, and a portion of each slot is straight or concentric and another portion tangential or gradually inclined, the tangential part for one pair of cutters being arranged on the right-hand side of the straight portions, while for the other pair of cutters the tangential part is to the left of said straight portions, so that when the ring is turned in one direction the pins or rollers $i$ of the cutters $e$ to be advanced enter the tangential portions of the slots $h$, while those of the cutters retracted are in the straight portions of the slots. When the ring is turned in the opposite direction, the cutters previously advanced are at first retracted by the inclined parts of the slots, and then in the further movement of the ring the other pair of cutters is made to advance by their pins or rollers entering the inclined portions of the slots.

In the apparatus with only one cutter (represented in Fig. 4) the mandrel $c$ is capable of being turned around its pivot $b$ by a ring $g'$, provided with a handle $k$, this ring being placed round the neck of the mandrel $c$, carrying ratchet-teeth $z$ and provided with a pawl $l$. The cutting is effected in several operations, and for this purpose the mandrel $c$ with the object or body to be cut must turn through a part of a revolution, but during the cutting it must remain at rest. After the ring $g'$ and the mandrel $c$, which latter is connected to the ring $g'$ by the engagement of the pawl and ratchet-teeth, have been caused to make quarter of a revolution by moving the handle $k$, the stop $n$, fixed to the base-plate $a$, releases the pawl $l$ from engagement with the ratchet-teeth $z$. The mandrel is thereby stopped, and in the further movement of the ring $g'$ the mandrel remains stationary and the handle $k$ moves a bell-crank lever $m$, which is pivoted by a pin $o$ to the base-plate $a$. One arm of this lever $m$ engages by an open slot with a pin or roller on the handle $k$, while the other slotted arm engages with a pin or roller on the cutter $e$. As soon as the object to be cut is moved through a corresponding length and stopped by the pawl $l$ being released the bell-crank lever $m$ causes, during the further movement of the ring $g'$, the cutter $e$ to advance and cut the glass, the cutter being retracted when the handle $k$ is returned to its starting position.

The before-described apparatus may be modified without departing from the spirit of the invention. For example, although it is described as provided with one cutter, Fig. 4, and four cutters, Figs. 1, 2, and 3, three or more than four cutters may be used.

I claim—

1. In an apparatus of the character described, the combination with a mandrel adapted to support the body to be cut, of a plurality of radially-movable cutters adapted when moved inwardly to operate upon and completely encircle the body to be cut whereby said body is cut entirely around at one operation of the cutters, and points and recesses on and in the cutters, the points adapted to fit or engage in the recesses when the cutters are moved inwardly, wholly to surround the article as specified.

2. In an apparatus of the character described, the combination with a mandrel adapted to support the body to be cut, of a plurality of radially-movable cutters, each of said cutters being provided with a projection or point and a recess immediately adjacent to said point whereby the cutters are adapted to engage when moved inwardly, each of the cutters having a cutting edge eccentric to the circumferential surface of the body to be cut, for the purpose specified.

3. In an apparatus of the character described, the combination with a mandrel adapted to support the body to be cut, of a radially-movable cutter, adapted to cut the edge of the body, and a second cutter carried by the first cutter in a plane above the same and adapted to move radially simultaneously with the latter, for the purpose of ornamenting the surface of the body simultaneously with the cutting of the edge of the latter.

4. In an apparatus of the character described, the combination with a hollow mandrel adapted to support the body to be cut, of a radially-movable cutter adapted to cut the edge of the body, and a second cutter carried by the first cutter in a plane above the same and adapted to move radially simultaneously with the latter, the hollow mandrel being provided circumferentially with an opening with which the second cutter is adapted to coöperate and through which opening the pieces of glass cut out of the body fall within the mandrel.

5. In an apparatus of the character described, the combination with a mandrel adapted to support the body to be cut, of radially-movable cutters, each provided with a projecting stud or roller, a revoluble ring provided with cam-slots into which the said studs or rollers project, the said slots being so shaped as to cause in one movement of the ring, one pair of diametrically opposite cutters to be moved inwardly and another pair of cutters, outwardly, and a reverse movement of the cutters when the ring is moved in the opposite direction, as specified.

In testimony whereof I have hereunto set my hand in presence of two witnesses.

BERNHARD GRUHL.

Witnesses:
HERNANDO DE SOTO,
PAUL ARRAS.